United States Patent
Whinnett et al.

[11] Patent Number: 6,122,270
[45] Date of Patent: Sep. 19, 2000

[54] COMMUNICATIONS SYSTEM AND A METHOD THEREFOR

[75] Inventors: Nicholas William Whinnett, Paris; William Neil Robinson, Saint Nom la Breteche, both of France; Joanthan Alastair Gibbs, Southampton, United Kingdom

[73] Assignee: Motorola, Inc., Schaumburg, Ill.

[21] Appl. No.: 08/875,319

[22] PCT Filed: Jan. 25, 1996

[86] PCT No.: PCT/EP96/00326

§ 371 Date: Oct. 16, 1997

§ 102(e) Date: Oct. 16, 1997

[87] PCT Pub. No.: WO96/23369

PCT Pub. Date: Aug. 1, 1996

[30] Foreign Application Priority Data

Jan. 28, 1995 [GB] United Kingdom .................. 9501697

[51] Int. Cl.[7] .................................... H04B 7/216
[52] U.S. Cl. ..................... 370/342; 370/465; 455/436
[58] Field of Search ........................... 370/252, 331, 370/332, 333, 335, 337, 342, 350, 465, 468, 477, 521, 503, 347; 455/436, 442

[56] References Cited

U.S. PATENT DOCUMENTS

| | | | |
|---|---|---|---|
| 5,295,153 | 3/1994 | Gudmundson | 370/335 |
| 5,483,668 | 1/1996 | Malkamaki et al. | 370/331 |
| 5,640,414 | 6/1997 | Blakeney, II et al. | 370/332 |
| 5,640,679 | 6/1997 | Lundqvist et al. | 455/33.2 |
| 5,671,218 | 9/1997 | I et al. | 370/332 |
| 5,828,659 | 10/1998 | Teder et al. | 370/328 |

*Primary Examiner*—Hassan Kizou
*Assistant Examiner*—Daniel Previl
*Attorney, Agent, or Firm*—Susan L. Lukasik

[57] ABSTRACT

An apparatus and method enabling a mobile station to transfer its communications between two dissimilar communications systems, for example, between a first communications system having a time continuous structure, such as a CDMA system, and an alternate communications system having a time discontinuous structure, such as a TDMA system. In one embodiment, the mobile station initiates a time-compressed mode of operation of the first system in which, for a portion of each frame, transmission is disabled, accesses the second system during the disabled periods and specifies to the first system frame structure information of the second system. The first system adjusts the time-compressed mode of operation so that communication with the mobile station occurs during 'N' time slots of each frame, the widths and positions of each slot within each frame being set in order to avoid contention with communications to and from the second system.

18 Claims, 4 Drawing Sheets

5 ms TDMA 2 ms TDMA 5 ms TDMA
REQUIRED PEAK POWER REDUCED

COMMUNICATIONS SYSTEM AND A METHOD THEREFOR

FIELD OF THE INVENTION

This invention relates to communications systems and more particularly, to a communications system for operation on a number of different air interface technologies and a method therefor.

BACKGROUND TO THE INVENTION

For the future provision of mobile telecommunications services, it is envisaged that a number of air interface technologies will be deployed with overlapping coverage areas and that such a mixed deployment of system technologies will be required in an attempt to address specific services and environments.

In the US, both Time Division Multiple Access (TDMA) schemes (such as U.S. Digital Cellular USDC) and Code Division Multiple Access (CDMA) schemes (such as a variant of the Qualcomm system) are likely to be deployed as a wide area cellular service for the Personal Communications System (PCS). WACS (Wireless Access Communications Systems, as defined by Bellcore) is another TDMA system and is likely to be deployed in micro-cellular and pico-cellular environments. In Europe, CDMA third generation systems (based on the RACE CODIT research project) may co-exist with second generation TDMA systems such as Global System for Mobile Communications (GSM) and Digital European Cordless Telephony (DECT) as well as third generation TDMA systems.

With such a mixed deployment of systems, it is desirable for a handset to be both capable of multi-mode operation and of seamless handover between access technologies such as TDMA and CDMA.

FIG. 1 shows the prior art of handing-off between cells operating similar CDMA systems on different frequencies as employed by the RACE CODIT system. In this system, handoff is achieved by a mobile station (MS) and both base stations (BSs) entering a time compressed mode of operation. In this time compressed mode the mobile communications can occur at twice the bit rate for half of the time on each system.

This is possible in CDMA systems by reducing the spreading factor when in compressed mode so that the data rate increases while the chip rate remains constant. To compensate for the reduced spreading factor, which protects against co-channel interference, the power during the compressed mode is increased. In such a way a MS is able to continue its communication with the CDMA system, and simultaneously monitor and subsequently access another frequency, whilst the call is being transferred to the new system.

In order to initiate a handoff sequence, a MS monitors candidate BSs on new frequencies. FIG. 1 comprises four graphs that detail handoff between two CDMA systems: graph 10 showing the uplink transmissions between a MS and a first CDMA BS (BS1), graph 20 showing the uplink transmissions between the MS and the second CDMA BS (BS2), graph 30 showing the downlink transmissions between the first CDMA BS (BS1) and the MS and graph 40 showing the downlink transmissions between the second CDMA BS (BS2) and the MS. The term "uplink" is used to define a communication from a MS to a BS and the term "downlink" is used to define a communication from a BS to a MS.

To facilitate a monitoring of two frequencies and a handoff execution process, the MS requests from the first BS a time compressed mode of operation 12 as shown in Graph 10. Graph 30 indicates the switch to the time compressed mode of operation performed by the first BS 32. The MS monitors the activity of the second BS 34. The MS then requests from the first BS, handoff to the second BS 14. In the following time slot the MS transmits half of the time to the first BS 16 and half of the time to the second BS 22 using the time compressed mode of operation. The term "time slot" includes the switching time, guard time, ramp time and slot time.

Graphs 20 and 40 show the communications between the MS and the second BS. The link between the MS and the second BS is first established in the time compressed mode 22. After a short period the link between the MS and the second BS is then returned to a normal (non-time compressed) mode of operation 24. Graphs 10, 20, 30 and 40 also show signalling channels 18 which are used to establish and relinquish compressed mode operation. The signalling channel 18 is code division multiplexed on to the traffic channel.

A new approach is required when handoff is required between two dissimilar access technologies. Specifically, a candidate system may be a TDMA system. By definition, TDMA is time discontinuous and hence, the prior art is not sufficient to allow access to general TDMA systems since the characteristics of the compressed transmissions in the prior art are fixed at 50% duty cycle and twice the transmit power.

Thus it is desirable to have a multi-mode handset capable of handoff between a flexible time domain system and a second time domain system and a method of operation thereof.

SUMMARY OF THE INVENTION

According to the invention, a communications system is provided having a mobile station and at least two time domain systems, one of which is a first flexible time domain system, the communications system comprises a means for initiating time adjusted operation by the mobile station on the first flexible time domain system and means for informing by the mobile station to the flexible time domain system at least one particular activity requirement of the mobile station.

A method is also provided for handing off a MS between two time domain systems where at least one of the time domain systems is a flexible time domain system, the method includes the steps of the MS initiating a time-adjusted mode of operation on the flexible time domain system and informing the flexible time domain system at least one particular activity requirement of the MS.

In a preferred embodiment the first flexible time domain system uses CDMA technology and the second time domain system uses TDMA technology.

DETAILED DESCRIPTION OF DRAWINGS

Figure 1:
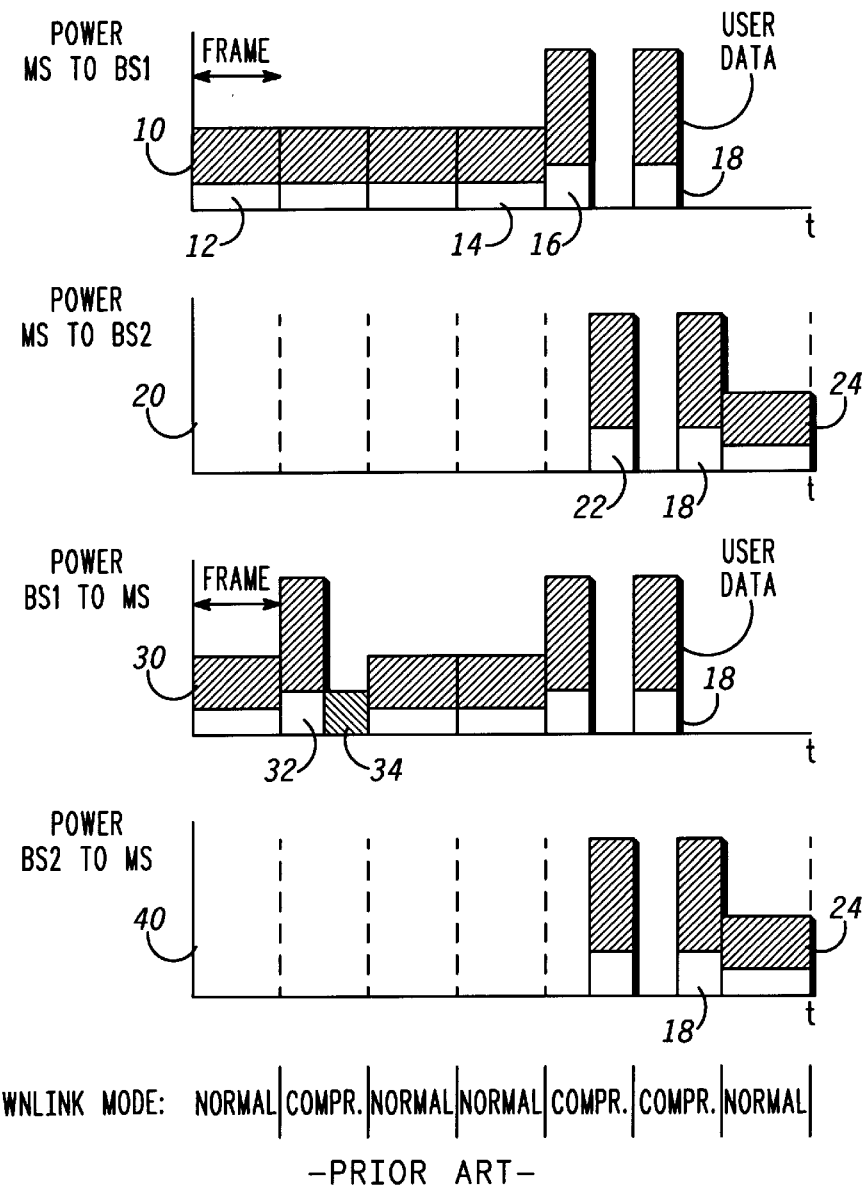
FIG. 1 shows time domain graphs of uplink and downlink transmissions associated with the prior art for handoff between two CDMA systems.
Figure 2:
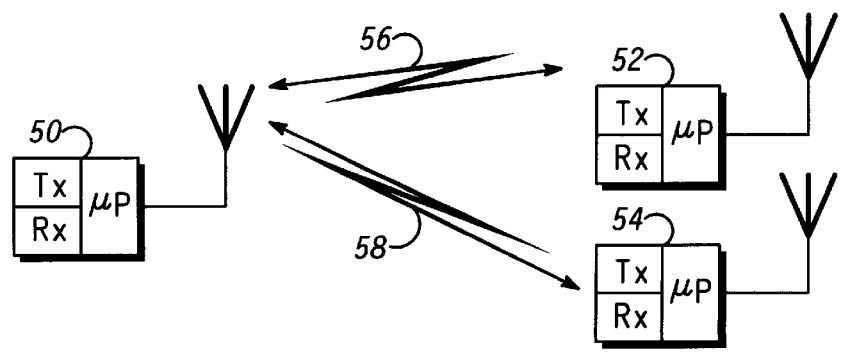
FIG. 2 shows a block diagram of a preferred embodiment of the communications system.

Referring first to FIG. 2 a block diagram of a communications system is shown in accordance with the preferred embodiment of the invention. The communications system comprises a mobile station (MS) 50, a base station (BS) 52 operating on a first flexible time domain system and a BS 54 operating on a second time domain system. The MS can communicate with both the first flexible time domain system 56 and the second time domain system 58.

Figure 3:
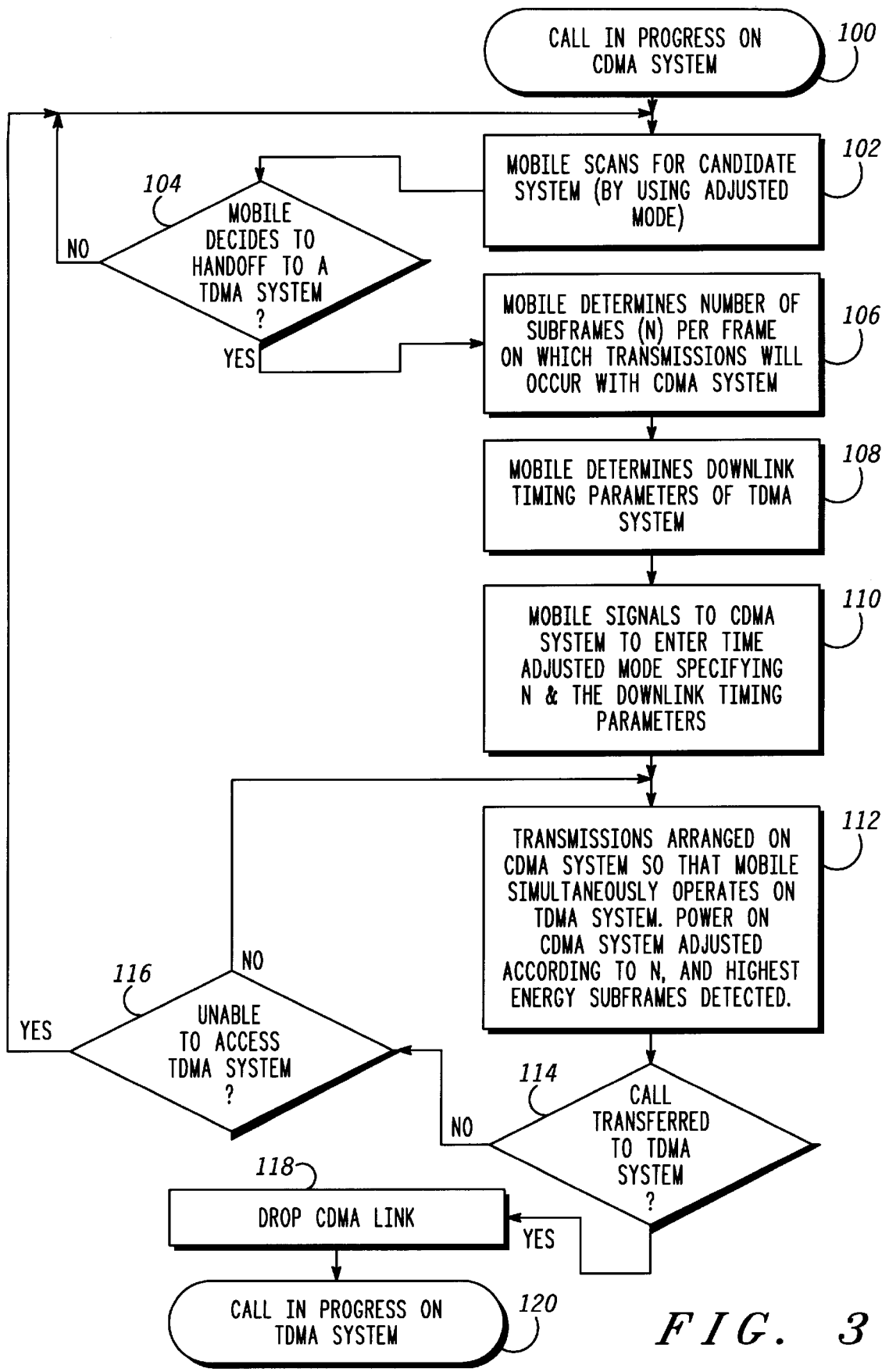
FIG. 3 shows a flow chart for a method of handoff between the two communications systems of FIG. 2 according to the present invention.

FIG. 3 shows a flow chart for handoff between a first flexible time domain system and a second time domain system. In a preferred embodiment of the present invention the first flexible time domain system is a Code Division Multiple Access (CDMA) system and the second time domain system is a Time Division Multiple Access (TDMA) system. In step 100 the MS is in communication with the CDMA system. The MS continually scans alternative candidate systems in a time adjusted mode as in step 102. When the MS decides to handoff to the TDMA system as in step 104 the MS determines the number of sub frames "N" per frame on which transmissions to the CDMA system will occur during the handoff process step 106. The value of "N" is chosen to avoid contention at the MS between the received TDMA and CDMA transmissions. The MS also monitors the downlink timing parameters of the TDMA system as in step 108 and informs the CDMA BS to enter the time adjusted mode specifying "N" and the downlink timing parameters of the TDMA BS as in step 110. The transmissions are arranged on the CDMA system, such that the MS simultaneously operates on the TDMA system. The CDMA BS and the MS adjust their transmitted power levels on the CDMA system to be inversely proportional to "N", with the highest energy sub-frames being detected and processed as in step 112. The call can then be transferred to the TDMA system as determined in step 114. The CDMA link is then dropped as in step 118 and the call progressed on the TDMA system as in step 120. If the MS was unable to access the TDMA system as in step 116 the MS returns to the scan mode as in step 102.

In the preferred embodiment of the invention, a MS and BS are in communication via a time continuous CDMA channel. Soft handoff occurs between cells on the same frequency within the same system as required, as known to those skilled in the art. However, occasionally handoff to a cell operating on a new carrier is necessary. This is usually required because the mobile needs to switch to a new cell type (classified by size and power) due to coverage considerations (for example moving out of an urban area where micro-cells are employed) or due to mobility considerations (for example an increase in user speed so that a larger cell is more suitable).

Figure 4:
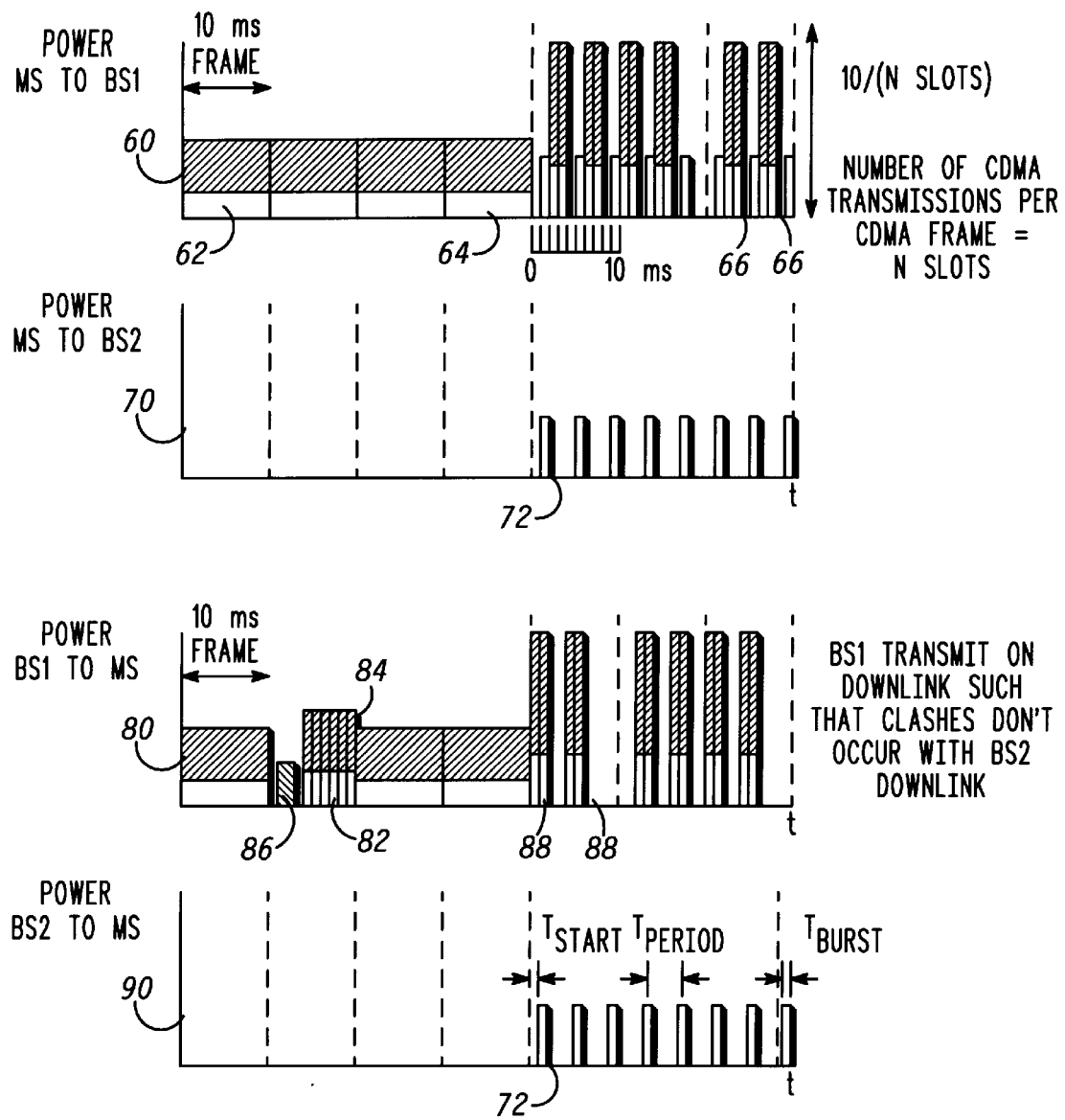
FIG. 4 shows time domain graphs detailing the transmissions between the two time domain systems and the mobile station for the preferred embodiment of the handoff operation of FIG. 2.

FIG. 4 shows the time domain graphs that detail both a multi-mode operation of the MS wherein the MS communicates simultaneously with the CDMA and the TDMA systems, in addition to the handoff operation between the CDMA system and the TDMA system of the preferred embodiment of the invention. FIG. 4 includes: graph 60 showing the uplink transmissions between the MS and the CDMA BS (BS1), graph 70 showing the uplink transmissions between the MS and the TDMA BS (BS2), graph 80 showing the downlink transmissions between the MS and the CDMA BS (BS1) and graph 90 showing the downlink transmissions between the TDMA BS (BS2) and the MS.

To enable monitoring of candidate systems for the MS graph 60 shows the MS requesting a time adjusted mode of operation of the CDMA system 62, specifying a desired compression rate and a time offset at which to disable transmission. A CDMA downlink frame is then sub-divided into (N) slots 82 as shown in graph 80. The CDMA BS then transmits in a time adjusted mode on the downlink with increased power 84 allowing the mobile to monitor the TDMA system 86. The ability to move to a low compression rate (compared with the prior art) has several benefits, including the fact that there is less disruption to the closed loop power control employed on many CDMA systems due to a shorter interruption of transmissions, and a requirement for a lower peak power.

After monitoring the TDMA system 86, a MS may wish to initiate a handoff to that system and thus sends a request to the CDMA system to again enter time adjusted mode 64. This time the time adjusted mode may continue for a large number of CDMA frames as a MS will have to register with the TDMA system and the call will have to be transferred before the link from the CDMA system can be dropped. The CDMA BS is informed of some parameters relating to the TDMA system, in particular frame time and slot duration (including guard, ramp and switching times), and the position of the first downlink TDMA slot in relation to the CDMA frame. In addition, the MS 66 and CDMA BS 88 agree to transmit on a certain number of CDMA slots per CDMA frame. This information is passed as part of the handoff request. Alternatively, a predefined set of parameters can be recalled for a particular TDMA technology, with the relative time offsets between the CDMA and TDMA frames being supplied by the mobile.

Graph 60 shows the MS transmitting on the agreed number of CDMA timeslots 66. The particular timeslots on which a MS transmits will be decided by the MS in order to avoid contention with the TDMA system. The CDMA BS selects a number of the highest energy slots out of the CDMA frame. Alternatively, the MS may indicate in advance on the uplink of graph 60 which CDMA timeslots will be used. However this would require a higher signalling overhead.

On the CDMA downlink shown in graph 80, the CDMA BS calculates which slots a MS is able to receive transmissions on, and of these the CDMA BS will then transmit on the required number of slots 88. The MS will select the highest energy CDMA slots to receive. Alternatively, there may be a predefined pattern of CDMA slots on which the CDMA BS will transmit.

Graph 70 and graph 90 show the communications between the MS and the TDMA BS (BS2). The TDMA communications link is established as shown 72. For some TDMA systems, the MS may be assigned new slots for signalling once random access has occurred. In this case, the MS must send on the CDMA uplink new timing information for the downlink transmissions. Once the TDMA link has been established the CDMA communications can be dropped, if required.

Figure 5:
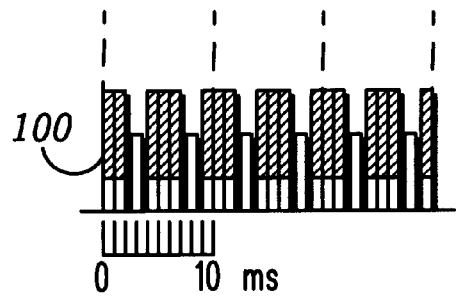
FIG. 5 shows time domain graphs detailing time domain transmissions where a high compression rate of the CDMA system is required in the preferred embodiment of the handoff operation of FIG. 2.
Figure 5:
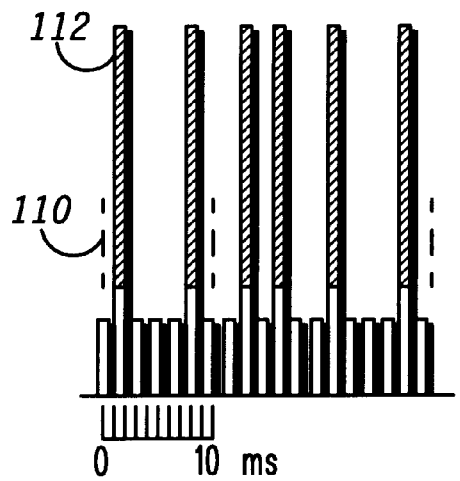
Figure 5:
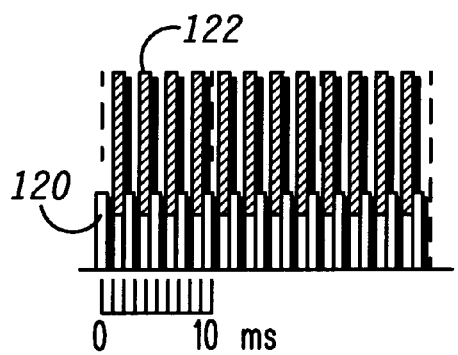

FIG. 5 includes examples of different TDMA frame times comprising: graph 100 showing typical multi-mode transmissions to the CDMA and TDMA systems of the preferred embodiment of the invention, graph 110 showing a situation where a high compression rate of the CDMA transmissions is required, resulting in significant increase in peak power and graph 120 showing the preferred embodiment of the invention in a situation where a high compression rate is otherwise required.

In the preferred embodiment of the invention it is assumed that CDMA transmissions only occur in fixed time slots of the CDMA frame. In certain circumstances where the TDMA frame time is very short (eg 2 ms) the adoption of a time adjusted mode of operation leads to the requirement for a very high compression ratio 112, which in turn requires a high peak power transmitted by the MS which is undesirable as shown in graph 110. This problem is reduced in the preferred embodiment of the invention by providing overlapping sub-frame positions, as shown in graph 120.

The overlapping of sub-frames advantageously provides more freedom in the selection of the CDMA sub-frame positions so that the transmissions occupy a greater number of (overlapping) positions 122 in the frame, whilst still maintaining the slot durations.

In principle the invention could be generalised to allow any slot length at any position.

Thus a communication system and method are provided where a multi-mode mobile station is able to handoff between two different access systems.

We claim:

1. A communications apparatus comprising a first communications system having a time continuous frame structure and a mobile station for communication therewith, wherein the mobile station is able to communicate with a second communication system having a time discontinuous frame structure, the apparatus further including:

means in the mobile station for initiating a time compressed mode of operation of the first system in which for a portion of each frame, transmission is disabled;

means in the mobile station for accessing, during the disabled periods, the second system;

means in the mobile station for specifying to the first system frame structure information of the second system; and means in the first system for adjusting the time-compressed mode of operation so that communication with the mobile station occurs during 'N' time slots of each frame, the width and position of each slot within each frame being set in order to avoid contention with communications to and from the second system.

2. The communications apparatus of claim 1 wherein the first system is a CDMA system and the second system is a TDMA system.

3. The communications apparatus of claim 1 wherein the frame structure information includes a position of the first downlink slot of the second system in the relation to the frame structure of the first system.

4. The communications apparatus of claim 1 wherein the mobile station includes means for informing the first system of the number of time slots 'N' per frame during which communications will occur.

5. The communications apparatus of claim 1 further comprising means for processing the 'N' highest energy received time-slots.

6. The communications apparatus of claim 1 further comprising means for arranging adjustment of power transmitted by the mobile station and the first system, by the mobile station, to a power level inversely proportional to 'N'.

7. A method of facilitating handing-off a mobile station between a first communications system having a time continuous frame structure and a second communications system having a time discontinuous frame structure, the method comprising the steps of:

initiating a time compressed mode of operation of the first system by the mobile station in which for a portion of each frame, transmission is disabled;

accessing in the mobile station during the disabled periods, the second system;

specifying to the first system by the mobile station, frame structure information of the second system; and adjusting in the first system, the time-compressed mode of operation so that communication with the mobile station occurs during 'N' time slots of each frame, the widths and position of each slot within each frame being set in order to avoid contention with communications to and from the second system.

8. The method of claim 7 including the further step of by the mobile station informing the first system of the number of time slots 'N' per frame during which communications will occur.

9. The method of claim 7 wherein the first system is a CDMA system and the second system is a TDMA system.

10. The method of claim 7 wherein the frame structure information includes a position of the first downlink slot of the second system in the relation to the frame structure of the first system.

11. The method of claim 7 further comprising processing the 'N' highest energy received time slots.

12. The method of claim 7 further comprising arranging adjustment of power transmitted by the mobile station and the first system, by the mobile station, to a power level inversely proportional to 'N'.

13. A communications apparatus comprising a first communications system having a time continuous frame structure and a mobile station for communication therewith, wherein the mobile station is able to communicate with a second communication system having a time discontinuous frame structure, the apparatus further including:

a time compressed operation mode initiator in the mobile station operable to initiate a time compressed mode of operation of the first system in which for a portion of each frame, transmission is disabled;

an access unit in the mobile station operable to access, during the disabled periods, the second system;

a frame structure information unit in the mobile station operable to specify to the first system frame structure information of the second system; and an adjuster in the first system operable to adjust the time-compressed mode of operation so that communication with the mobile station occurs during 'N' time slots of each frame, the width and position of each slot within each frame being set in order to avoid contention with communications to and from the second system.

14. The communications apparatus of claim 13 wherein the first system is a CDMA system and the second system is a TDMA system.

15. The communications apparatus of claim 13 wherein the frame structure information includes a position of the first downlink slot of the second system in the relation to the frame structure of the first system.

16. The communications apparatus of claim 13 further including a time slot information unit in the mobile station operable to inform the first system of the number of time slots 'N' per frame during which communications will occur.

17. The communications apparatus of claim 13 further comprising a processor operable to process the 'N' highest energy received time-slots.

18. The communications apparatus of claim 13 further comprising a power level adjuster operable to arrange adjustment of power transmitted by the mobile station and the first system, by the mobile station, to a power level inversely proportional to 'N'.

* * * * *

UNITED STATES PATENT AND TRADEMARK OFFICE
CERTIFICATE OF CORRECTION

PATENT NO. : 6,122,270
DATED : September 19, 2000
INVENTOR(S) : Whinnett et al.

It is certified that error appears in the above-identified patent and that said Letters Patent is hereby corrected as shown below:

On the Title Page, Item

[75] Inventors: reads "Joanthan Alastair Gibbs" and it should be -- Jonathan Alastair Gibbs --

Signed and Sealed this

Fifteenth Day of May, 2001

*Attest:*

NICHOLAS P. GODICI

*Attesting Officer*     *Acting Director of the United States Patent and Trademark Office*